US010151379B2

(12) United States Patent
Manzoor et al.

(10) Patent No.: US 10,151,379 B2
(45) Date of Patent: Dec. 11, 2018

(54) TORSIONAL VIBRATION DAMPERS

(71) Applicants: Suhale Manzoor, Plymouth, MI (US);
Anthony Eugene Lannutti,
Fayetteville, AR (US); Christopher R. Buddington, Livonia, MI (US);
William J. Piepsney, Canton, MI (US)

(72) Inventors: Suhale Manzoor, Plymouth, MI (US);
Anthony Eugene Lannutti,
Fayetteville, AR (US); Christopher R. Buddington, Livonia, MI (US);
William J. Piepsney, Canton, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 23 days.

(21) Appl. No.: 14/883,172

(22) Filed: Oct. 14, 2015

(65) Prior Publication Data

US 2016/0102730 A1  Apr. 14, 2016

Related U.S. Application Data

(60) Provisional application No. 62/063,933, filed on Oct. 14, 2014.

(51) Int. Cl.
*F16H 55/36* (2006.01)
*F16F 15/126* (2006.01)

(52) U.S. Cl.
CPC .......... *F16H 55/36* (2013.01); *F16F 15/126* (2013.01); *F16H 2055/366* (2013.01)

(58) Field of Classification Search
CPC .... F16F 15/1442; F16F 15/126; F16F 15/167; Y10T 74/2131; F16H 2055/366

(Continued)

(56) References Cited

U.S. PATENT DOCUMENTS 379,022 A * 3/1888 Morgan ................. F16H 55/14
464/71
1,701,518 A * 2/1929 Walker ................. F16F 15/1442
74/574.4

(Continued)

OTHER PUBLICATIONS

PCT, International Search Report and Written Opinion, PCT/US2015/055525, (Feb. 2, 2016).

(Continued)

*Primary Examiner* — Henry Y Liu
(74) *Attorney, Agent, or Firm* — FisherBroyles, LLP; Susan M. Oiler (57) ABSTRACT

Torsional vibration dampers are disclosed that have a hub having a plate extending radially outward about a shaft-receiving member, a first portion of an inertia member defining a back face and a bore therethrough and having an annular flange concentric about the axis of rotation, a first elastomeric member and a second elastomeric member positioned against opposite sides of the plate, and a second portion of the inertia member fastened to the first portion of the inertia member by one or more fasteners, thereby placing the first and second elastomeric members in compression. The shaft-receiving member of the hub is positioned in the bore with the plate of the hub spaced a distance from an interior surface of the annular flange, and the plate of the hub and the interior surfaces of each of the first and second portions of the inertia member facing the plate define dual common vertices.

18 Claims, 8 Drawing Sheets

(58) Field of Classification Search
USPC .......................................... 474/94; 74/574.4
See application file for complete search history.

(56) References Cited

U.S. PATENT DOCUMENTS

| | | | | |
|---|---|---|---|---|
| 1,838,023 A * | 12/1931 | Manville | ............ | F16F 15/1492 74/433.5 |
| 1,916,309 A * | 7/1933 | Griswold | ............ | F16F 15/1492 74/574.2 |
| 1,949,520 A * | 3/1934 | Whisler | ............... | F16F 15/136 464/96 |
| 2,204,953 A * | 6/1940 | Wittmer | ............ | B60B 17/0041 105/131 |
| 2,450,701 A * | 10/1948 | Wahlberg | ................. | F16D 3/70 29/450 |
| 2,538,499 A | 1/1951 | Benoit | | |
| 2,672,907 A * | 3/1954 | Maclean | .................. | B60B 9/10 152/41 |
| 2,674,897 A * | 4/1954 | Heinish | .................. | F16H 55/50 152/41 |
| 2,764,038 A * | 9/1956 | Peirce | ................ | F16F 15/1442 74/574.4 |
| 2,885,870 A * | 5/1959 | Jaklitsch | ................... | F16D 3/76 464/89 |
| 3,174,360 A * | 3/1965 | Katzenberger | ........ | F16F 15/167 464/68.3 |
| 3,196,710 A * | 7/1965 | Peirce | ................. | F16F 15/1442 188/268 |
| 3,373,633 A * | 3/1968 | Desmond | ............. | F16F 15/165 188/266 |
| 3,410,369 A * | 11/1968 | Mizuro | ............... | F16F 15/1442 188/379 |
| 3,440,899 A * | 4/1969 | Ward | .................. | F16F 15/1442 464/68.3 |
| 3,479,907 A * | 11/1969 | Hall | ..................... | F16F 15/126 74/574.4 |
| 3,678,782 A * | 7/1972 | Aoki | .................. | F16F 15/1442 188/322.5 |
| 3,865,216 A * | 2/1975 | Gryglas | .................... | F16F 9/12 188/290 |
| 3,992,963 A * | 11/1976 | Khanna | ................ | F16F 15/173 188/322.5 |
| 4,023,438 A * | 5/1977 | Birkle | ..................... | F02B 77/00 188/268 |
| 4,041,803 A * | 8/1977 | Goloff | ....................... | 416/134 R |
| 4,098,373 A * | 7/1978 | Troyer | ................ | F16F 15/1442 188/379 |
| 4,109,545 A * | 8/1978 | Hayasaka | ................ | F16H 55/12 474/152 |
| 4,114,246 A * | 9/1978 | Kamman | ............ | F16F 15/1442 156/145 |
| 4,150,587 A * | 4/1979 | Bremer, Jr. | .......... | F16F 15/1442 464/89 |
| 4,200,004 A * | 4/1980 | Bremer, Jr. | .......... | F16F 15/1442 74/573.12 |
| 4,220,056 A * | 9/1980 | Bremer, Jr. | .......... | F16F 15/1442 74/574.4 |
| 4,339,862 A * | 7/1982 | McLean | ............. | F16F 15/1442 29/424 |
| 4,341,130 A * | 7/1982 | Shepherd | ............ | F16F 15/1442 464/180 |
| 4,368,807 A * | 1/1983 | McLean | ............. | F16F 15/1442 188/322.5 |
| 4,378,865 A * | 4/1983 | McLean | ............. | F16F 15/1442 188/379 |
| 4,462,270 A * | 7/1984 | Cooper | ............... | F16F 15/1442 188/379 |
| 4,509,804 A * | 4/1985 | Klusman | ............. | F16C 27/045 384/535 |
| 4,585,431 A * | 4/1986 | Umeda | ............. | B62D 55/0963 474/161 |
| 4,601,676 A * | 7/1986 | Tojima | ............. | F16F 15/12326 192/205 |
| 4,790,792 A * | 12/1988 | Bopp | ..................... | F16H 45/02 192/213 |
| 4,850,243 A * | 7/1989 | George | ............... | F16F 15/1442 74/574.4 |
| 4,914,799 A * | 4/1990 | Kyle | ..................... | F16D 35/00 192/208 |
| 4,936,433 A * | 6/1990 | Kyle | ..................... | F16F 15/165 192/208 |
| 5,098,358 A * | 3/1992 | Igaku | ..................... | F16H 1/2836 475/335 |
| 5,117,704 A * | 6/1992 | Kish | ....................... | B64C 27/12 464/75 |
| 5,341,780 A * | 8/1994 | Rau | ........................ | F02B 61/02 123/192.1 |
| 5,452,622 A * | 9/1995 | Fenelon | .................. | F16H 55/14 264/242 |
| 5,562,544 A * | 10/1996 | Ochs | .................... | F16F 15/1442 464/89 |
| 5,611,416 A * | 3/1997 | Berger | ................. | F16D 35/005 192/104 F |
| 5,749,269 A * | 5/1998 | Szymanski | ............. | F16F 15/14 74/573.12 |
| RE35,932 E * | 10/1998 | Cerny | .................... | F16F 15/126 464/68.91 |
| 6,675,759 B2 * | 1/2004 | Johnson | ............... | F16F 15/1201 123/192.1 |
| 6,742,412 B2 * | 6/2004 | Feldhaus | ................ | F16F 15/145 188/378 |
| 6,875,113 B2 * | 4/2005 | Nichols | ............... | F16F 15/1442 464/90 |
| 7,372,182 B2 * | 5/2008 | Poore | ...................... | H02K 21/24 310/156.36 |
| 7,850,557 B2 * | 12/2010 | Moriya | .................... | F16H 55/36 464/90 |
| 7,905,159 B2 * | 3/2011 | Manzoor | .............. | F16F 15/124 74/574.4 |
| 8,015,897 B2 * | 9/2011 | Fisher | ..................... | F02B 67/06 74/572.2 |
| 8,146,457 B2 * | 4/2012 | Wright | .................. | F16F 15/145 74/572.2 |
| 8,262,520 B2 * | 9/2012 | Shimamura | ............... | F16D 3/12 464/71 |
| 8,342,058 B2 * | 1/2013 | Christenson | ............ | F16F 7/108 74/572.2 |
| 8,397,602 B2 * | 3/2013 | Christenson | .......... | F16F 15/126 74/574.4 |
| 8,656,807 B2 * | 2/2014 | McCalmont | ........ | F16F 15/1442 464/71 |
| 9,599,209 B2 * | 3/2017 | Manzoor | ............. | F16H 55/36 |
| 2005/0050985 A1 * | 3/2005 | Crissy | .................. | F16F 15/126 74/574.4 |
| 2005/0066767 A1 * | 3/2005 | Patterson | ................ | F16F 7/108 74/574.2 |
| 2006/0172832 A1 * | 8/2006 | Watanabe | ............. | F16F 15/126 474/94 |
| 2007/0295569 A1 * | 12/2007 | Manzoor | ............. | F16F 15/124 188/379 |
| 2008/0136073 A1 * | 6/2008 | Kreuzer | ............... | B60R 21/2037 267/140.11 |
| 2009/0000421 A1 * | 1/2009 | Christenson | .......... | F16F 15/126 74/574.4 |
| 2013/0210533 A1 * | 8/2013 | Kobus | ................. | F16F 15/1442 464/180 |
| 2015/0252885 A1 * | 9/2015 | Manzoor | ................ | F16H 55/36 474/148 |

OTHER PUBLICATIONS

EP, Supplemental Search Report; European Application No. 15851189.9 (dated Jul. 19, 2018).
CN, Search Report; Chinese Application No. 201580054207.X (dated Jul. 27, 2018).

(56) References Cited

OTHER PUBLICATIONS

CN, First Office Action; Chinese Application No. 201580054207.X (dated Jul. 27, 2018).

* cited by examiner

TORSIONAL VIBRATION DAMPERS

RELATED APPLICATIONS

This application claims the benefit of U.S. Provisional Application No. 62/063,933, filed Oct. 14, 2014, the entirety of which is incorporated by reference.

TECHNICAL FIELD

The present invention relates to torsional vibration dampers, in particular, a damper system facilitated by one or more fasteners connecting the inertia member through the hub, but where the hub drives the inertia member through first and second elastomeric members.

BACKGROUND

Torsional vibration dampers are used in the automotive industry to reduce the vibrations in a shaft (crank shaft, drive shaft, prop shaft, etc.), thereby enhancing its fatigue life. The simplest torsional vibration damper consists of three functional components: (1) a hub, which is a rigid structural bracket that attaches the torsional vibration damper to the shaft; (2) an elastomer, which provides a spring damper system for the torsional vibration damper; and (3) an active inertial mass called the ring, which vibrates with a magnified amplitude, but exactly opposite phase relative to the shaft vibration(s). In most elastomer-based torsional vibration dampers, there are two mechanisms that actively reduce vibration: (1) by absorption of the vibrations due to tuning the torsional vibration damper to a particular frequency; and (2) by viscous damping due to the elastomeric material and the inertial system. In addition to vibration attenuation, torsional vibration dampers that are attached to the crankshaft of an internal combustion engine also power an external belt drive through an endless belt system that drives the front end accessory drive system.

There is always a need for better, less complex, less expensive, easier to manufacture, easier to assemble or disassemble torsional vibration dampers—in particular, one that can be disassembled and reassembled easily for replacement of the elastomeric material.

SUMMARY

In one aspect, torsional vibration dampers are disclosed that are easier to assemble and disassemble, in particular ones that can be disassembled and reassembled easily to replace the elastomeric material after wear. The torsional vibration dampers include a hub that has a shaft-receiving member defining an axis of rotation. The hub has a plate extending radially outward about the shaft-receiving member. The inertia member of the torsional vibration damper has a first portion thereof defining a back face and a bore therethrough and having an annular flange concentric about the axis of rotation, and a second portion fastened to the first portion by one or more fasteners, thereby placing a first elastomeric member and a second elastomeric member in compression against opposite sides of the plate of the hub. While in compression against the plate, the first and second elastomeric members are spaced a distance apart from the radial inner surface of the annular flange of the first portion of the inertia member. In the assembled state, the shaft-receiving member of the hub is positioned in the bore of the first portion of the inertia member with the plate of the hub spaced a distance from an interior surface of the annular flange thereof.

The one or more fasteners are typically shoulder bolts connecting the first portion of the inertia member to the second portion of the inertia member with a clearance gap surrounding the fastener as it passes through the hub. The hub has minimal parasitic inertia, and the annular flange of the inertia member has a belt-engaging surface that may include a plurality of grooves.

The plate of the hub and the interior surfaces of each of the first and second portions of the inertia member facing the plate define dual common vertices. For example, the opposing surfaces of the plate each define an angled plane of one of the dual common vertices, the interior surfaces of each of the first and second portions of the inertia member facing the plate each define an angled plane of one of the dual common vertices, or both the opposing surfaces of the plate and each of the interior surfaces of the first and second portions of the inertia member facing the plate define angled planes of the dual common vertices.

The first elastomeric member and/or the second elastomeric member comprise concentric O-rings.

In another aspect, front end accessory drive systems are disclosed that include any one of the torsional vibration dampers discussed above and below.

In another aspect, a system comprising a shaft having any one of the torsional vibration dampers discussed above and below is disclosed, such as a prop shaft, a drive shaft, etc.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 2:
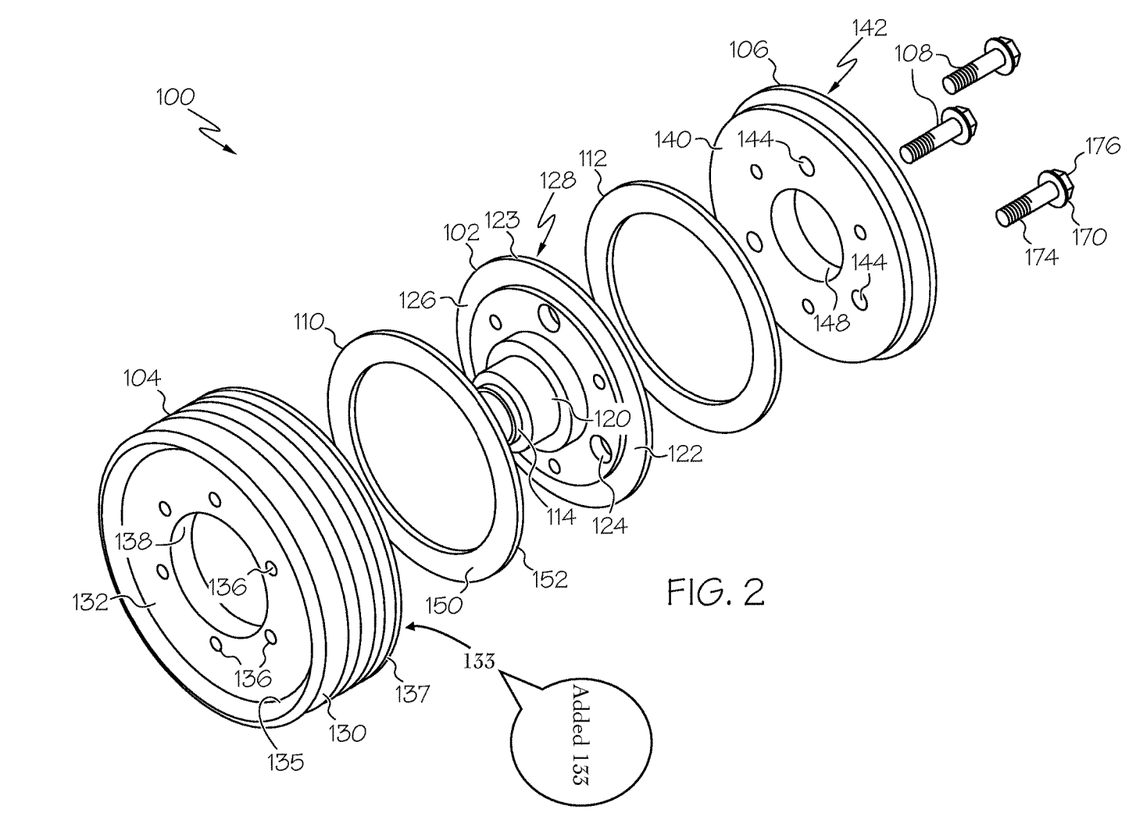
FIG. 2 is an exploded, perspective view of one embodiment of a torsional vibration damper.
Figure 3:
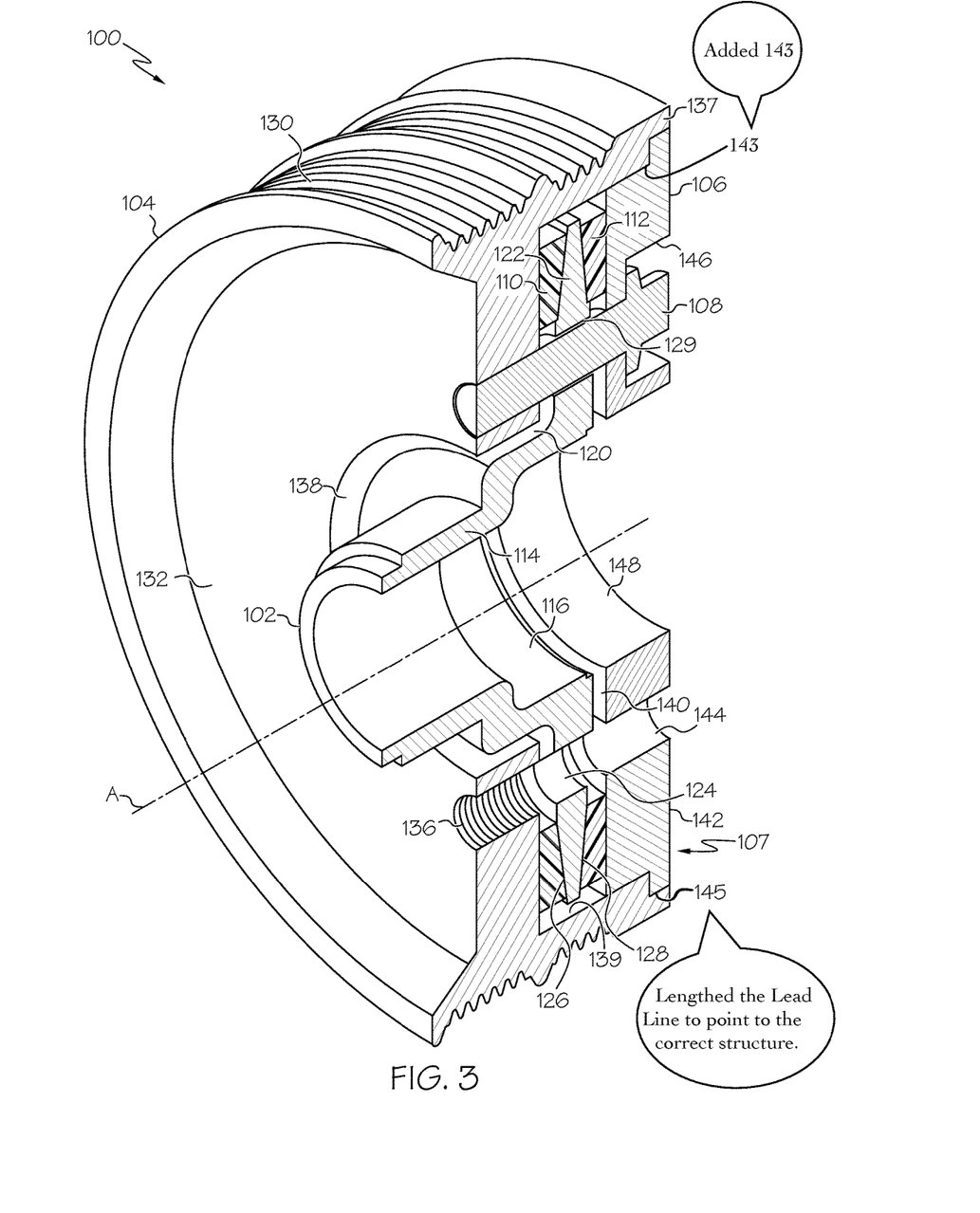
FIG. 3 is a cross-section taken parallel to the axis of rotation of the torsional vibration damper of FIG. 2 in an assembled state.

A new torsional vibration damper, generally designated by reference 100, exemplified in FIGS. 2 and 3 is disclosed. The torsional vibration damper 100 overcomes the parasitic inertia experience by the hub in the construction illustrated and described in U.S. Pat. No. 8,397,602 and simplifies the assembly compared to roll-forming required in U.S. Pat. No. 7,905,159. The torsional vibration damper 100 includes from left to right, relative to the orientation of the drawing relative to the page, a pulley body 104 (or first part of an inertia member), a first elastomeric member 110, a hub 102, a second elastomeric member 112, a cover plate 106 (second part of the inertia member), and a plurality of fasteners 108. The plurality of fasteners 108 connect the cover plate 106 to the pulley body 104 to place the first and second elastomeric members 110, 112 in compression against opposing sides 126, 128 of the hub 102. Each of the fasteners 108 passes through separate, individual apertures 124 in the hub 102 with clearance, gap 129 shown in FIGS. 3 and 5, such that the fasteners do not couple the hub 102 to the inertia member 104 or to the cover plate 106. Instead, the hub 102 is operatively coupled to the inertia member 104 and the cover plate 106 for rotation therewith through the compression of the first and second elastomeric members 110, 112, which, in the assembled state, are compressed against opposing faces 126, 128 of the hub 102 by the bolted together inertia member 107 (pulley body 104 and cover plate 106). The assembly of the components using the fasteners 108 provides the extra advantage (besides the ease of assembly) of being able to replace one of the elastomeric rings while the torsional vibration damper is mounted on a shaft.

Figure 1:
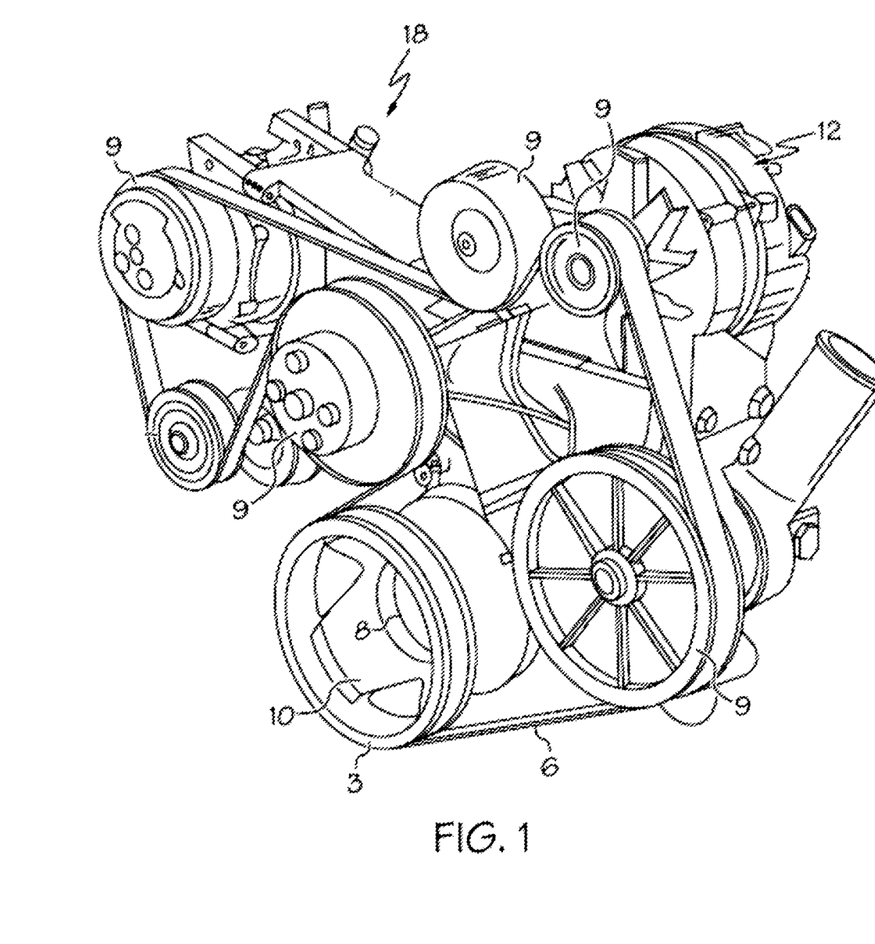
FIG. 1 is a perspective view of components in a front end accessory drive.

Still referring to FIGS. 2 and 3, the hub 102 defines the axis of rotation A (FIG. 3) for the torsional vibration damper 100 and includes a plate 122 extending radially outward about a shaft-receiving member 114 that defines a bore 116. The shaft-receiving member 114 may extend axially in only one direction from the plate 122, thereby defining the back face of the torsional vibration damper 100, which in an embodiment such as the one illustrated in FIG. 1, the face is facing the engine. The face of plate 122, facing the direction that the shaft-receiving member 114 extends, is identified as the first face 126 and opposite thereof is a second face 128. The bore 116 is configured (shaped and sized) to receive and be coupled to a shaft for rotational movement therewith. In FIG. 1, one exemplary embodiment, the shaft is a crankshaft of a FEAD system 18. The FEAD system may include engine drive accessories 9 mounted thereto that are driven by at least one endless drive belt 6, which may be a flat belt, a rounded belt, a V-belt, a multi-groove belt, a ribbed belt, etc., or a combination of the aforementioned belts, being single or double sided. The endless drive belt 6 may be a serpentine belt, and is wound around the engine drive accessories 9, the alternator 12 and the torsional vibration damper 3, which is connected to the nose 10 of the crankshaft 8. The crankshaft drives the torsional vibration damper 3 and thereby drives the endless drive belt 6, which in turn drives the remaining engine drive accessories 9 and the alternator 12.

While FIG. 1 illustrates a FEAD with a crankshaft, the shaft upon which the torsional vibration dampers 100, 100' disclosed herein may be mounted is not limited thereto, and in other embodiments, the shaft may be a drive shaft, a prop shaft, or the like.

Figure 4A:
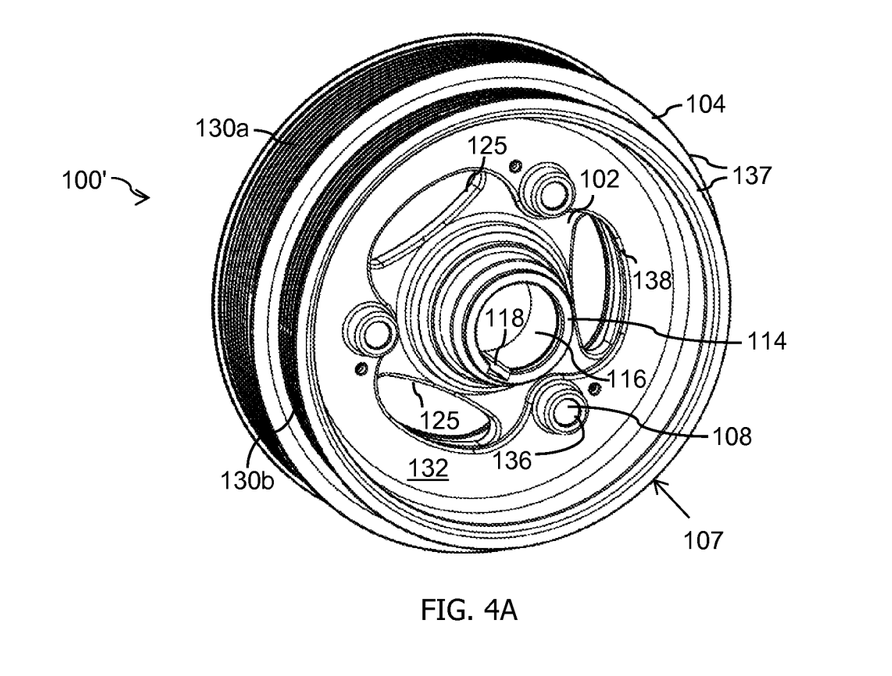
FIG. 4A is an assembled perspective view of the back face of a second embodiment of a torsional vibration damper.
Figure 4B:
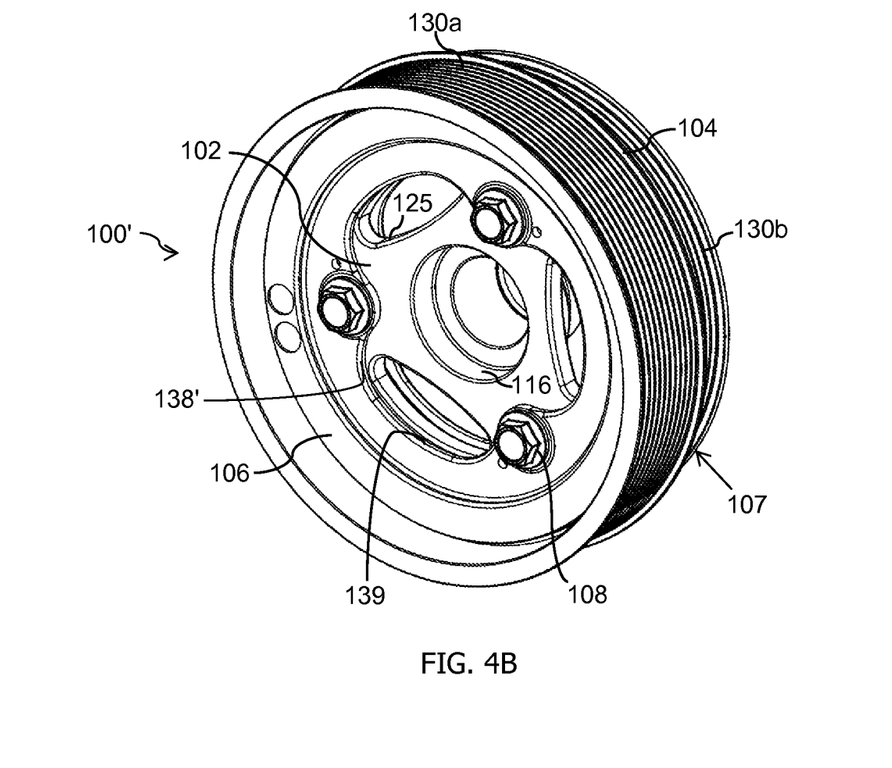
FIG. 4B is an assembled perspective view of the front face of the torsional vibration damper of FIG. 4A.
Figure 5:
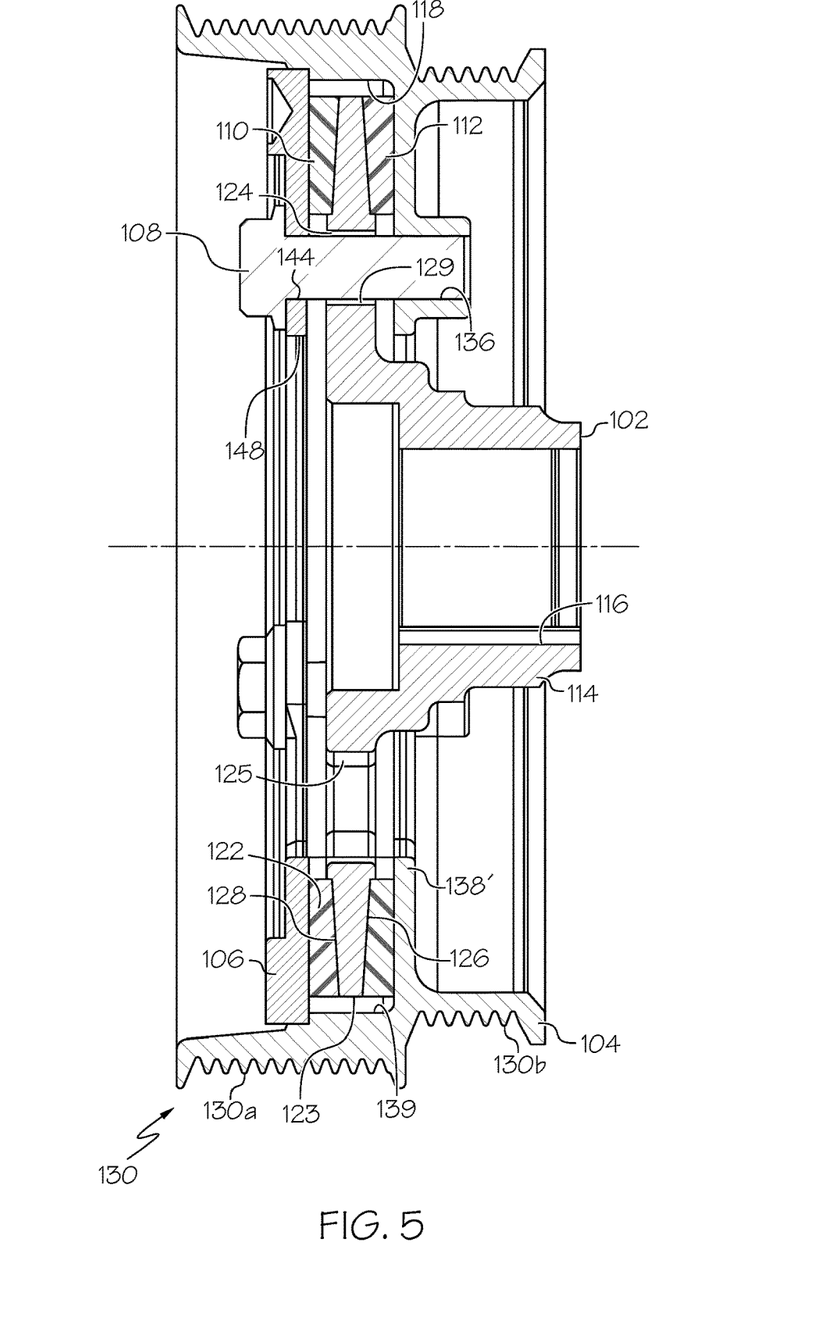
FIG. 5 is a cross-section taken parallel to the axis of rotation of the torsional vibration damper of FIG. 4.

Referring now to FIGS. 2 and 3 and FIGS. 4 and 5, the hub 102 of the torsional vibration dampers 100, 100' does not include a flange extending axially in either or both directions from the outermost side of the hub 102. Here, the hub 102 includes plate 122 that terminates with an annular outermost side 123 devoid of any flange(s). As represented in FIG. 5, the opposing faces 126, 128 of the hub defining the outermost edge thereof, proximate the annular outermost side 123, are beveled from a position more proximate the axis of rotation A outward toward the outermost side 123 such that a line coextensive with the beveled surface of the first face 126 and a second line coextensive with the beveled surface of the second face 128, each extending radially inward will independently cross a line coextensive with the most proximate interior surface of the inertia member 107, thereby each defining a vertex. Accordingly, the torsional vibrations dampers have a dual common vertex construction relative to the elastomeric members. The result of such beveled surfaces is that the hub 102 and pulley body 104 and hub 102 and cover plate 106 define a smaller gap for the elastomeric member more proximate the axis of rotation A than more distal the axis of rotation A, and the gap widens gradually moving radially outward away from the axis of rotation A. Such a construction keeps the elastomeric members 110, 112 in a state of uniform shear strain during oscillation of the inertia member 107 with respect to the hub 102.

In FIGS. 2-5, the torsional vibration dampers have the hub defining the angled planes of the dual common vertices. Other variations are illustrated in FIGS. 7-8 and 9A-9C.

Further, the torsional vibration dampers 100, 100' have a hub 102 that has a smaller outer diameter compared to the inner diameter of portion of the pulley body 104 defining inner cavity 139. The outer diameter of the hub 102 is small enough that a gap 118 is defined between the hub 102 and the pulley body 104. The first and second elastomeric members 110, 112 are axially compressed against the hub, but do not extend into or fill the gap 118.

Now referring to FIGS. 4A, 4B, and 5, in this embodiment the hub 102 of the torsional vibration damper 100' further defines enlarged openings 125 therethrough, which are advantageous to reduce the weight of the hub 102. As illustrated, the enlarged openings 125, which are larger than the apertures 124 that receive the fasteners 108, may be generally oval shaped and positioned in the hub 102 for alignment with generally central apertures 138' of the inertia member 107 (one aperture in the first portion of the pulley body, i.e., the pulley body 104, and one in the second portion of the pulley body, i.e., the cover plate 106). The hub 102 may also include an alignment feature 118 (FIG. 4A) for mating with a mating alignment feature (not shown) on a shaft. In one embodiment, the alignment feature 118 may be a keyway and in another embodiment may be a key for mating with a keyway in a shaft.

Referring again to FIGS. 2 and 3, the pulley body 104 includes a back face end 132 defining a generally central aperture 138 therethrough in the axial direction that receives the shaft-receiving member 120 therein. The back face end 132 also defines one or more other apertures 136 therethrough in the axial direction that each receives one of the fasteners 108. When the fasteners 108 include threads, the apertures 136 are each threaded to receive the threads of one of the fasteners. The back face end 132 includes an annular flange 137 extending axially from and forming part of the outer periphery 135 (FIG. 2) thereof. The annular flange 137 may extend axially in both directions away from the back face end 132. In one embodiment, the annular flange 137 extends more in one axial direction (to the right in FIGS. 2 and 3, toward the front face of the damper) than the other and thereby defines an inner cavity 139 (FIG. 3) in which the first and second elastomeric members 110, 112 and the hub 102 are seated.

Now referring to FIGS. 4A and 4B, the torsional vibration damper 100' has many of the same components and features as the torsional vibration damper 100 of FIGS. 2 and 3. As such, like reference numbers are used for the same or similar features. In FIG. 4A, the pulley body 104 includes a back face end 132 defining a generally central aperture therethrough 138' and in FIG. 4B, the opposing front face FF may also have a generally central aperture 138' therethrough. The generally central aperture 138' of one or both of the back face and the front face may be a trefoil-shaped void. Here, the trefoil-shaped void is illustrated as having generally oval-shaped lobes, but the void is not limited thereto. Moreover, the trefoil-shaped voids 138' are large enough to enable the enlarged openings 125 in the hub 102 to be visible from both the front face and the back face.

In the embodiment of FIGS. 2 and 3, the annular flange 137 includes a belt engaging surface 130 as the radially outermost surface of the pulley body 104. The belt engaging surface 130 may be flat, contoured to receive a rounded belt, or have V-grooves for mating with the V-ribs of a V-ribbed belt or any other required contoured groove to mate with an endless belt. As seen in FIG. 2, the belt engaging surface 130 may be divided into two separate sections for receiving two separate endless belts. In one embodiment, both sections may be flat, contoured to receive a rounded belt, or have V-grooves for mating with a V-rib or V-ribbed belt or any combination thereof.

Now referring to FIGS. 4A, 4B, and 5, the belt engaging surface 130 may include a first belt engaging section 130a more proximate the front face and a second belt engaging section 130b more proximate the back face. The first belt engaging section 130a and the second belt engaging section 130b may have different outer diameters. The outer diameter of the second belt engaging section 130b may be less than the outer diameter of the first belt engaging section 130a or vice versa. Additionally, or in another embodiment, the first belt engaging section 130a may be wider than the second belt engaging section 130b or vice versa.

The pulley body 104 and/or the hub 102 of both torsional vibration dampers 100, 100' may be cast, spun, forged, machined, or molded using known or hereinafter developed techniques. Suitable material for the hub 102 includes grey-iron, steel, aluminum, other suitable metals, plastics, or a combination thereof, including composite materials. The pulley body 104 (also the inertia member in this embodiment) may be made from material having a sufficient mass, usually a cast iron metal.

Figure 6A:
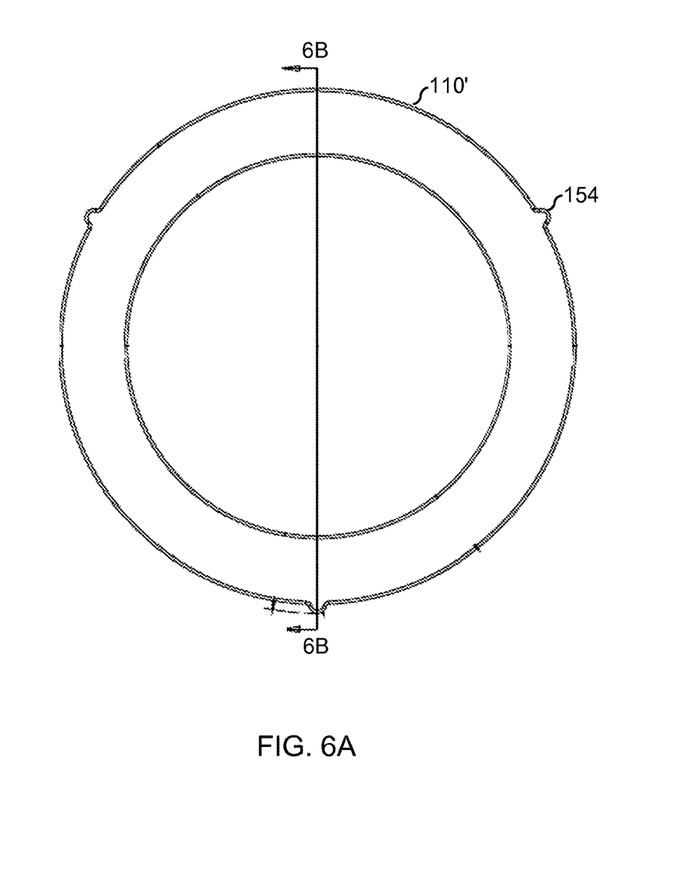
FIG. 6A is a front plan view of one embodiment of a first elastomeric member.
Figure 6B:
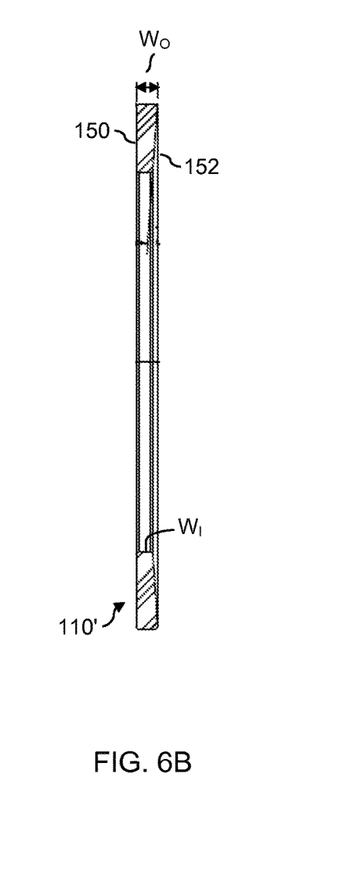
FIG. 6B is a cross-sectional view of the first elastomeric member of FIG. 6A taken along line 6B-6B.

Now turning to the first and second elastomeric members 110, 112, these members are shown as annular bodies having first and second major opposing surfaces 150, 152 as labeled on the first elastomeric member 110 in FIG. 2 and the first elastomeric member 110' in FIG. 6B, but are not limited thereto. As shown in FIGS. 6A and 6B, the first elastomeric member 110' (and/or the second elastomeric member (not shown)) may include one or more alignment members 154. In FIG. 6A, the alignment members 154 protrude from the outer side thereof as generally rounded protrusions. In other embodiments, the alignment members 154 may protrude from the inner side of the elastomeric member or may be recessed in the outer side or the inner side that receives a protrusion from a mating component of the torsional vibration damper. In FIG. 6A, there are three alignment members 154 equi-distant apart from one another, but the number and placement of the alignment members 154 are not limited thereto. Also, as illustrated in FIG. 6B, the first elastomeric member 110' may have a first major surface 150 that is generally perpendicular to the axis of rotation and a second major surface 152, opposite the first major surface 150, that is beveled to have an opposite mating profile to the first face 126 of the hub against which the first elastomeric member is meant to be seated. As a result of the angle or bevel of the second major surface 152, the first elastomeric member 110' has an outermost width $W_O$ that is wider than the innermost width $W_I$ as labeled in FIG. 6B. The second major surface 152 in both the first and the second elastomeric members is the surface that will face and be seated against a surface of the hub 102. Thus, similarly, the second elastomeric member will have a first major surface that is generally perpendicular to the axis of rotation and a second major surface that is beveled to have an opposite profile to the second face 128 of the hub against which the second elastomeric member is meant to be seated.

Figure 7:
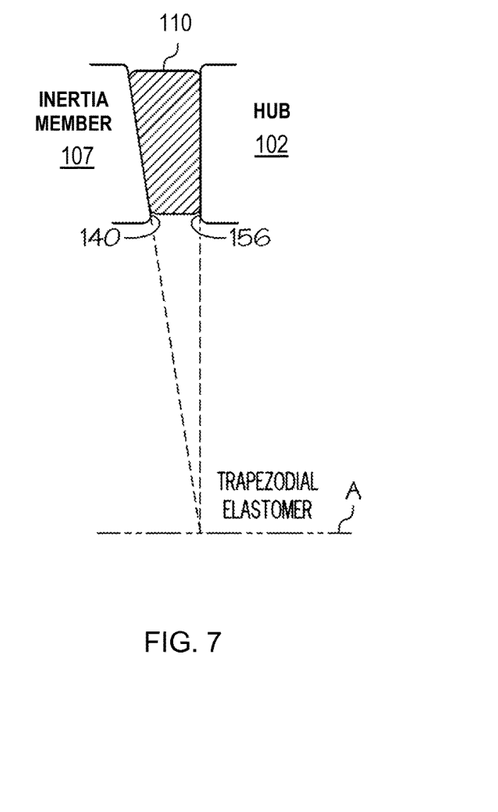
FIG. 7 is a partial cross-sectional view of another embodiment of a torsional vibration damper having an alternate configuration for the dual common vertices.
Figure 8:
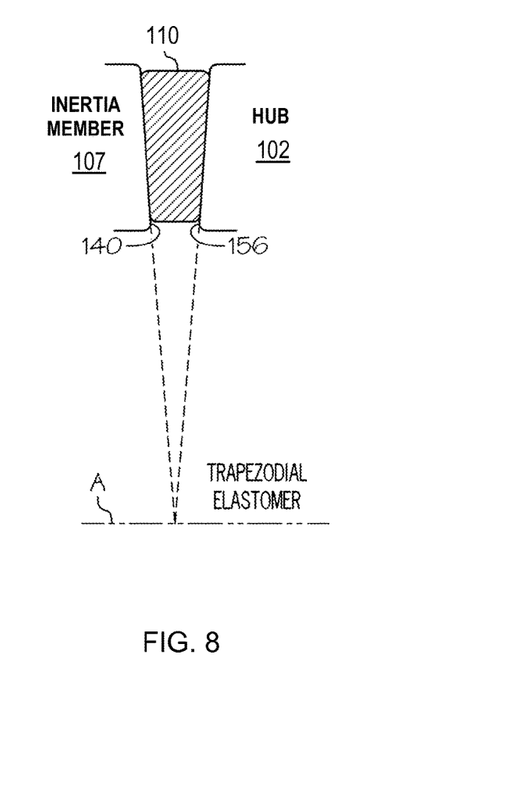
FIG. 8 is a second partial cross-sectional view of another embodiment of a torsional vibration damper having an alternate configuration for the dual common vertices.

Now turning to FIGS. 7 and 8, the interior surface 140 of the inertia member 107 and the surface of the hub 102 facing the same may either one or both be beveled (define an angled plane as described above with respect to a common vertex) for at least the portion seated against an elastomeric member 110 or 112. FIG. 7 has the inertia member 107 (both the cover 106' and the pulley body 104') defining angled planes while the hub 102 has opposing surfaces that are generally perpendicular to the axis of rotation of the torsional vibration damper, and FIG. 8 has both the inertia member 107 and the hub defining angled planes. The surface that is beveled is beveled radially outwardly, thereby defining a smaller gap for the elastomeric member more proximate the axis of rotation A than most distal from the axis of rotation. Accordingly, multi-variations are possible for defining the gaps 156 in which the first and second elastomers 110, 112 are held, respectively, but the result is an elastomeric member having a generally trapezoidal longitudinal cross-section relative to the axis of rotation in an assembled state.

Figure 9A:
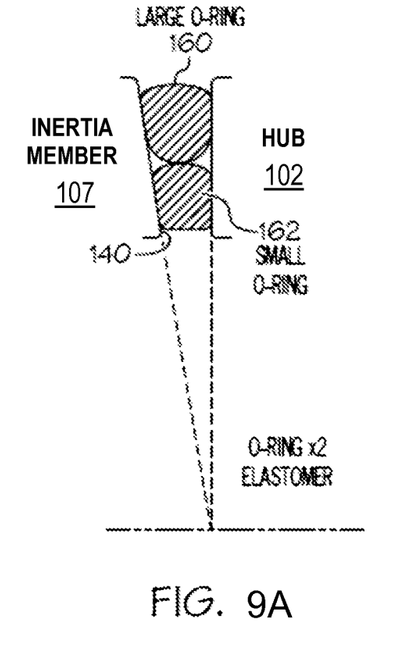
FIGS. 9A-9C are cross-sections taken parallel to the axis of rotation of other embodiments of torsional vibration dampers showing a portion of the inertia member, the first elastomeric member as concentric O-rings, and a portion of the inertia member to illustrate different embodiments for the opposing faces that hold the first elastomeric member in place.
Figure 9B:
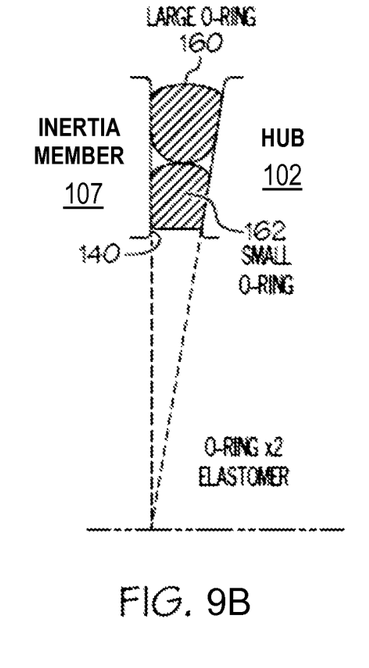
Figure 9C:
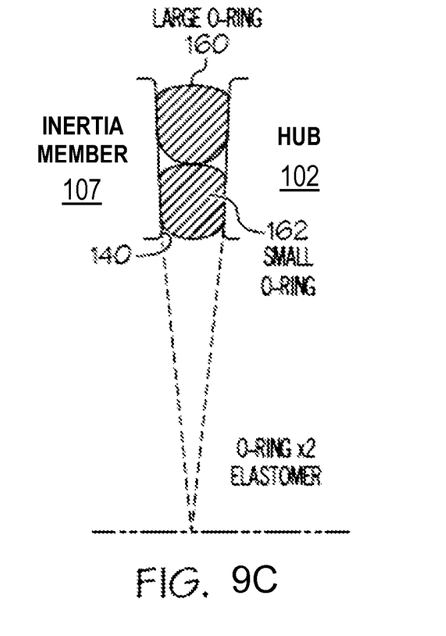

In the embodiments disclosed in FIGS. 9A-9C, the interior surface 140 of the inertia member 107 (either the pulley body 104 or the cover 106 depending on which face of torsional vibration damper is facing the left) and the surface of the hub 102 facing the same may either one or both be beveled (define an angled plane as described above with respect to a common vertex), and the elastomeric members 110, 112 may each be a plurality of O-rings, X-rings, V-rings, square rings, or other rings of elastomeric material. The same is true for the other part of the inertia member 107 (pulley body 104 or the cover 106) not shown in these FIGS. For these embodiments, each elastomeric member 110, 112 may include a first O-ring 160 and a second O-ring 162, where the first O-ring 160 has a larger inner diameter than the outer diameter of the second O-ring 162 and the first O-ring 160 is disposed concentric with and radially outward of the second O-ring 162. The use of O-ring type elastomeric members may provide a more cost-effective product and assembly thereof.

The first and second elastomeric members 110, 112 may be any suitable elastomer to absorb and/or damp the torsional vibrations generated by a rotating shaft upon which the torsional vibration damper 100 is mounted. The elastomeric members may have a generally low tensile modulus and high break strain. The elastomeric members may be made from the same or different elastomers. The elastomer is preferably one suitable for automotive engine applications, i.e., suitable to withstand temperatures experienced in the engine and road temperatures and conditions. In one embodiment, the elastomer members may be made from or include one or more of a styrene-butadiene rubber, a natural rubber, a nitrile butadiene rubber, an ethylene propylene diene rubber (EPDM), an ethylene acrylic elastomer, a hydrogenated nitrile butadiene rubber, and a polychoroprene rubber. One example of an ethylene acrylic elastomer is VAMAC® ethylene acrylic elastomer from E.I. du Pont de Nemours and Company. The elastomeric member may be a composite material that optionally includes a plurality of fibers dispersed therein. The fibers may be continuous or fragmented (chopped) aramid fiber like the fiber sold under the name TECHNORA® fiber.

The cover plate 106 together with the pulley body 104 is the active inertia member 107 of the torsional vibration damper 100. Together they provide the inertia for damping vibration. As best seen in FIG. 3, the cover plate 106 is seated on an inside annular shoulder 143 of the annular flange 137 at its open end 133 (FIG. 2) opposite the back face end 132. The cover plate 106 may include an inner annular shoulder 145, too, as shown in FIG. 3, but of the opposite profile of the annular shoulder 143 such that the inner annular shoulder 145 of the cover plate 106 mates therewith. As seen in FIG. 3, the cover plate 106 is seated within the portion of inner cavity 139 at the open end 133 thereof to provide a generally flat exterior surface to the front face of the torsional vibration damper 100. Now referring to FIG. 5, the cover plate 106 may further include an inner bore 148 that is generally shaped and positioned to match the central bore 138' of the pulley body 104.

The fasteners 108 include, but are not limited to, bolts, shoulder bolts, socket head cap screws, screws, rivets, or the like. In one embodiment, the fasteners are bolts, such as a shoulder bolt. As seen in FIGS. 2 and 3, the shoulder 170 of each fastener 108 hits a hard stop against the cover plate 106, which may include a threaded bore 144 for receiving a threaded end 174 of the fastener 108. Accordingly, each fastener 108 may include a head portion 176, a threaded end or shaft 174, and the shoulder 170 therebetween. As seen in the assembled torsional vibration damper 100 of FIG. 3, the fasteners 108 extend through bores 144 (threaded or non-threaded) in the cover plate 106, which is a part of the inertia member in this embodiment, through a nonthreaded, enlarged aperture 124 in the plate 122 of the hub 102, and are each threaded into a threaded bore 136 of the pulley body 104. The fasteners 108 and/or the cover plate 106 may be such that the head portion 176 of each fastener 108 is countersunk into recesses 146 in the cover plate 106 as seen in FIG. 3.

The torsional vibration dampers 100 disclosed herein may be referred to as having a "bolt-on" construction. This "bolt-on" construction is beneficial because of the ability to remove the fasteners 108 and replace at least the second elastomeric member 112. Additionally, it enables repeated assembly and disassembly thereof, and simplifies the original assembly operation by eliminating the need for an assembly press, roll-forming, or press-fitting of the components.

Although the invention is shown and described with respect to certain embodiments, it is obvious that modifications will occur to those skilled in the art upon reading and understanding the specification, and the present invention includes all such modifications.

What is claimed is:

1. A torsional vibration damper comprising:
    a hub having a shaft-receiving member defining an axis of rotation and a plate extending radially outward about the shaft-receiving member, wherein the plate terminates with an annular outermost side devoid of a flange;
    a first portion of an inertia member defining a back face and a bore therethrough and having an annular flange concentric about the axis of rotation, wherein the shaft-receiving member of the hub is positioned in the bore with the plate of the hub spaced a distance from an interior surface of the annular flange, thereby defining a gap between the annual outermost side of the plate and the interior surface of the annular flange of the inertia member;
    a first elastomeric member and a second elastomeric member positioned against opposite sides of the plate; and
    a second portion of the inertia member fastened to the first portion of the inertia member by one or more fasteners thereby placing the first elastomeric member and the second elastomeric member in axial compression, wherein the first and second elastomeric members do not extend into the gap.

2. The torsional vibration damper of claim 1, wherein the one or more fasteners are one or more shoulder bolts connecting the first portion of the inertia member to the second portion of the inertia member with a clearance gap surrounding the fastener through the hub.

3. The torsional vibration damper of claim 1, wherein either of the first portion or the second portion of the inertia member has one or more counterbores and a fastener seated in each counterbore.

4. The torsional vibration damper of claim 1, wherein the hub has minimal parasitic inertia.

5. The torsional vibration damper of claim 1, wherein the annular flange of the inertia member has a belt-engaging surface.

6. The torsional vibration damper of claim 5, wherein the belt engaging surface includes a plurality of grooves.

7. The torsional vibration damper of claim 1, wherein the plate of the hub and the interior surfaces of each of the first and second portions of the inertia member facing the plate define dual common vertices.

8. The torsional vibration damper of claim 7, wherein the opposing surfaces of the plate each define an angled plane of one of the dual common vertices, the interior surfaces of each of the first and second portions of the inertia member facing the plate each define an angled plane of one of the dual common vertices, or both the opposing surfaces of the plate and each of the interior surfaces of the first and second portions of the inertia member facing the plate define angled planes of the dual common vertices.

9. The torsional vibration damper of claim 8, wherein the first elastomeric member comprises concentric O-rings.

10. A front end accessory drive system comprising:
    a torsional vibration damper mounted to a crankshaft, the torsional vibration damper comprising:
    a hub having a shaft-receiving member defining an axis of rotation and a plate extending radially outward about the shaft-receiving member, wherein the plate terminates with an annular outermost side devoid of a flange;

a first portion of an inertia member defining a back face and a bore therethrough and having an annular flange concentric about the axis of rotation, wherein the shaft-receiving member of the hub is positioned in the bore with the plate of the hub spaced a distance from an interior surface of the annular flange, thereby defining a gap between the annual outermost side of the plate and the interior surface of the annular flange of the inertia member;

a first elastomeric member and a second elastomeric member positioned against opposite sides of the plate;

a second portion of the inertia member fastened to the first portion of the inertia member by one or more fasteners thereby placing the first elastomeric member and the second elastomeric member in axial compression, wherein the first and second elastomeric members do not extend into the gap.

11. The front end accessory drive system of claim 10, wherein the one or more fasteners are one or more shoulder bolts connecting the first portion of the inertia member to the second portion of the inertia member with a clearance gap surrounding the fastener through the hub.

12. The front end accessory drive system of claim 10, wherein the hub has minimal parasitic inertia.

13. The front end accessory drive system of claim 10, wherein the annular flange of the inertia member has a belt-engaging surface.

14. The front end accessory drive system of claim 13, wherein the belt engaging surface includes a plurality of grooves.

15. The front end accessory drive system of claim 10, wherein the plate of the hub and the interior surfaces of each of the first and second portions of the inertia member facing the plate define dual common vertices.

16. The front end accessory drive system of claim 15, wherein the opposing surfaces of the plate each define an angled plane of one of the dual common vertices, the interior surfaces of each of the first and second portions of the inertia member facing the plate each define an angled plane of one of the dual common vertices, or both the opposing surfaces of the plate and each of the interior surfaces of the first and second portions of the inertia member facing the plate define angled planes of the dual common vertices.

17. The front end accessory drive system of claim 16, wherein the first elastomeric member comprises concentric O-rings.

18. A system comprising a shaft having the torsional vibration damper of claim 1 mounted thereon with the shaft received in the shaft-receiving member of the hub.

* * * * *